Figure 1:
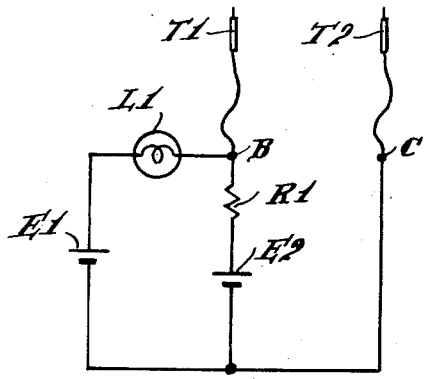

April 19, 1960     B. C. ADAMS     2,933,680

DYNAMIC SHORT LOCATOR

Filed May 15, 1958

Inventor
Bertram C. Adams
by Roberts, Cushman & Grover
Att'ys

United States Patent Office 2,933,680
Patented Apr. 19, 1960

2,933,680

DYNAMIC SHORT LOCATOR

Bertram C. Adams, Harwich Port, Mass.

Application May 15, 1958, Serial No. 735,578

5 Claims. (Cl. 324—51)

This invention relates to the location of short circuits in electrical circuits.

Objects of the invention are to provide a device useful in determining the precise location of shorts in a low resistance electrical circuit which will function with speed, accuracy and a minimum of physical dislocation of circuit wiring, which is unaffected by high resistances which may be interposed in the line to be tested, and which will not cease indication as the short is approached.

According to the present invention the device comprises two sources of substantially equal voltage having one like pole of each source interconnected, a current-conduction indicator connected across the other poles of said sources, and two test terminals connected one to each pole of one source, so that, when the test terminals are connected across a line having a relatively high resistance, said sources oppose current flow through the indicator, and such that, when resistance in the line across said test terminals is successively lowered, reduced opposition to current flow causes the indicator to give an increasingly dynamic indication. In more specific aspect, said indicator is connected in series with a dropping resistor across said poles of the sources and said test terminals are connected one to one source at a pole opposite said resistor and one to the resistor side of said indicator so that, when resistance in the line to be tested is varied over a relatively low resistance range, opposition to current flow through the indicator will continue to reduce giving a satisfactorily dynamic reading in the indicator.

In another aspect the invention comprises a current-conduction indicator, two test terminals connected one to each terminal of said indicator, a source of voltage connected across the terminals of said indicator, such that, when the test terminals are connected across a line having relatively high resistance, high current will pass through said indicator, and such that, when resistance in the line across said test terminals is successively lowered, increased shunting of the indicator causes the indicator to give a decreasingly dynamic indication.

In another aspect the invention combines the above mentioned circuits so that the device comprises two sources of substantially equal voltage having one like pole of each source interconnected, a current-conduction indicator connected across the other poles of said sources, a second current-conduction indicator connected across the poles of one source, and two test terminals connected one to each terminal of said second indicator, such that, when the test terminals are connected across a line having relatively high resistance, said sources oppose current flow through the first indicator and allow current to flow freely through the second indicator, and such that, when resistance in the line across said test terminals is successively lowered, reduced opposition to current flow causes the first indicator to give an increasingly dynamic indication and increased shunting of the second indicator causes the second indicator to give a decreasingly dynamic indication.

In another aspect the invention comprises a combination of circuits as set forth in the paragraph immediately above with a double pole single throw switch interposed in series with said second indicator, with a third current-conduction indicator, with a current limiting resistor, said third indicator and current limiting resistor being connected in series from the center terminal of said switch across the second indicator, with one of said test terminals connected to the center terminal of said switch, and with the other test terminal connected to that terminal of said second indicator not connected to said switch, such that, when the test terminals are connected across a line to be tested while said switch is open, the third indicator will indicate whether the line is conducting a current, and such that, when said switch is closed, the device will function substantially as set forth in the paragraph immediately above.

For the purpose of illustration typical embodiments of the invention are illustrated in the accompanying drawing in which Figs. 1–5 are schematic diagrams of different embodiments of the apparatus. Fig. 6 graphically illustrates current flow in the current conduction-indicators of the various embodiments during testing.

Fig. 1 is a schematic diagram of one embodiment of the invention in which E1 and E2 are batteries of substantially equal voltage having their negative poles interconnected. An incandescent lamp L1 and a dropping resistor R1 are connected in series across the positive poles of the batteries. One test terminal T1 is connected to the resistor side of the lamp, and another test terminal T2 is connected to a negative pole of one source battery. When the test terminals are connected across a line to be tested, the sources oppose current flow through the lamp unless a short is present in the line; then, if a short is present, the opposition to current flow in the lamp will reduce proportionately to the resistance in the shorted line. Thus as the test points are brought nearer the location of the short the lamp glows more brightly. In this embodiment, a lamp is used as the current-conduction indicator but a buzzer or a meter would serve, the lamp being preferred because of its low cost.

Figure 2:
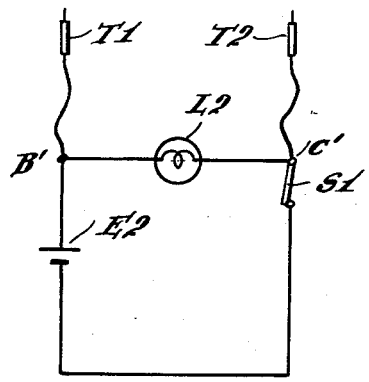

Fig. 2 is a schematic diagram of another embodiment of the invention in which a battery E2, a switch S1 and a lamp L2 are connected in a closed series circuit. Test terminals T1 and T2 are connected to either side of the lamp. When the test terminals are connected across a line to be tested while the switch is closed, all battery current flows through the lamp unless a short is present in the line; then, if a short is present current will be shunted across the lamp proportionately to the resistance in the shorted line. Thus as the test points are brought nearer the location of the short the lamp glows less brightly.

Figure 3:
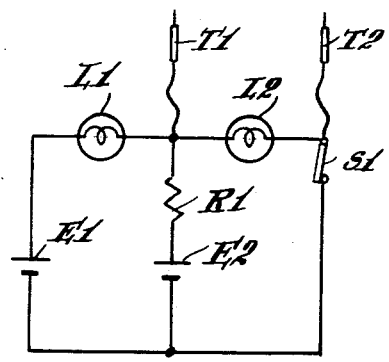

Fig. 3 is a schematic diagram of the invention in which the elements of Fig. 1 and Fig. 2 are combined. When the test terminals T1 and T2 are connected across a line to be tested, the sources oppose current flow through lamp L1 and force current to flow through lamp L2. If a short is present in the line, opposition to current flow through lamp L1 and shunting of current flow across lamp L2 will vary proportionately to the resistance in said line. Thus as the test points are brought nearer the location of the short, lamp L1 glows more brightly and lamp L2 glows less brightly.

Figure 4:
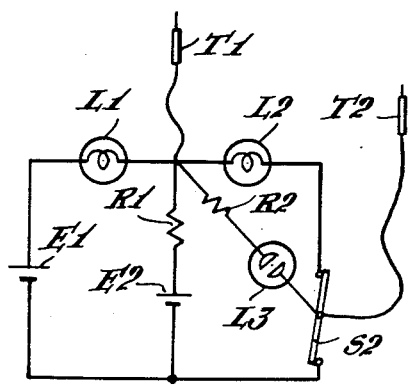

Fig. 4 is a schematic diagram of one embodiment of the invention similar to that shown in Fig. 3 but with switch S1 replaced by a double pole single throw switch S2. A third lamp L3 and a current limiting resistor R2 are connected in series from the center terminal of S2 across lamp L2. One test terminal T2 is connected to the center terminal of the switch. When the test terminals are connected across a line to be tested while the switch is open, lamp L3 will warn the operator whether a current is being conducted in the line. When said current in the line is interrupted, the switch may be closed to test for and locate a short substantially as in the embodiment set forth in Fig. 3.

Figure 5:
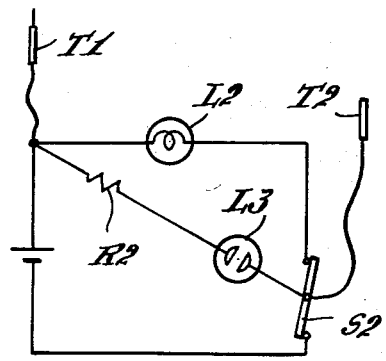
Figure 6:
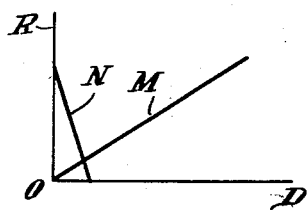

Fig. 5 is a schematic diagram of one embodiment similar to that shown in Fig. 2 but with switch S1 replaced by a double pole single throw switch S2. A second lamp L3 and a current limiting resistor R2 are connected in series from the center terminal of switch S2 across lamp L2. One test terminal is connected to the center terminal of the switch. When the switch is open, the operator may test for a current being conducted in the line to be tested, or, when the switch is closed, may test for and locate a short as in the embodiment set forth in Fig. 2. This short locator is characterized by the small amount of resistance contributed by the instrument to that portion of the shorted circuit, connected across the test terminals, which is to be tested for current flow. Thus, in the embodiment of Fig. 1, there is a minimum of resistance contributed by the instrument to that portion of the shorted circuit between points B and C. Likewise, in the Fig. 2 embodiment, there is minimal resistance contributed by the instrument to that portion of the shorted circuit between points B' and C'. Thus, when the operator draws near the precise location of the short, where change in position of the test terminals will only slightly reduce line resistance, the change in line resistance as the test terminals are moved will be significant relative to the instrument resistance, thereby causing a change in current-conduction indication sufficiently dynamic to be read with ease and clarity. This means that the operator can more precisely locate a short before he must resort to visual inspection of the shorted wires. This results in a saving of time and reduces the possibility that the shorted wires will be parted and the location of the defect thereby lost during visual inspection.

The embodiment illustrated in Fig. 1 will continue to give readable indication until the test terminals are connected directly across the short but this embodiment has a shorter range than the embodiment illustrated in Fig. 2. That is, the Fig. 2 embodiment will indicate the presence of a short in the line while the test terminals are still quite remote from the short location. However, the Fig. 2 embodiment ceases indication at a greater distance from the precise short location. Therefore the combination of these embodiments as illustrated in Fig. 3 is practical combining the best features of each. This is illustrated in the graph of Fig. 6 in which current intensity R in the current flow indicators L1 and L2 is laid along the graph ordinate. The distance D along the line to be tested between the test point and the point of short is laid along the graph abscissa. N, indicating the current intensity in L1, illustrates that L1 gives a very dynamic indication in the region close to the short but that this indicator has a short range. M, indicating the current intensity in L2, illustrates that L2 will not precisely locate the point of short but that L2 will indicate the general location of the short from a test point relatively remote from the short.

Figs. 4 and 5 incorporate a warning circuit to be used alternatively to indicate whether the line to be tested is carrying a current which might injure the instrument.

It should be understood that the present disclosure is for the purpose of illustration only and that this invention includes all modifications and equivalents which fall within the scope of the appended claims.

I claim:

1. A short circuit locating device comprising two sources of substantially equal voltage having one like pole of each source interconnected, a current-conduction indicator connected across the other poles of said sources, and two test terminals connected one to each pole of one source such that, when the test terminals are connected across a line having relatively high resistance, said sources oppose current flow through the indicator, and such that, when resistance in the line across said test terminals is successively lowered, reduced opposition to current flow causes the indicator to give an increasingly dynamic indication.

2. A short circuit locating device comprising two sources of substantially equal voltage having one like pole of each source interconnected, a current-conduction indicator, a dropping resistor, said indicator and resistor being connected in series across the other poles of said sources, a test terminal connected to the resistor side of said indicator, and a test terminal connected to one source at a pole opposite said resistor, such that, when the test terminals are connected across a line having relatively high resistance, said sources oppose current flow through said indicator, and such that, when resistance in the line across said test terminals is successively lowered, reduced opposition to current flow causes the indicator to give an increasingly dynamic indication.

3. A short circuit locating device comprising two sources of substantially equal voltage having one like pole of each source interconnected, a current-conduction indicator connected across the other poles of said sources, a second current-conduction indicator connected across the poles of one source, and two test terminals connected one to each terminal of said second indicator, such that, when the test terminals are connected across a line having relatively high resistance, said sources oppose current flow through the first indicator and allow current to flow freely through the second indicator, and such that, when resistance in the line across said test terminals is successively lowered, reduced opposition to current flow causes the first indicator to give an increasingly dynamic indication and increased shunting of the second indicator causes the second indicator to give a decreasingly dynamic indication.

4. A short circuit locating device comprising two sources of substantially equal voltage having one like pole of each source interconnected, a current-conduction indicator, a dropping resistor, said indicator and resistor being connected in series across the other poles of said sources, a second current-conduction indicator connected between the resistor side of the first indicator and one source at a pole opposite said resistor, and two test terminals connected one to each side of said second indicator, such that, when the test terminals are connected across a line having relatively high resistance, said sources oppose current flow through the first indicator and allow current to flow freely through the second indicator, and such that, when resistance in the line across said test terminals is successively lowered, reduced opposition to current flow causes the first indicator to give an increasingly dynamic indication and increased shunting of the second indicator causes the second indicator to give a decreasingly dynamic indication.

5. A short circuit locating device comprising two sources of substantially equal voltage having one like pole of each source interconnected, a current-conduction indicator, a dropping resistor, said indicator and resistor being connected in series across the other poles of said sources, a second current-conduction indicator, a double pole single throw switch, said second indicator and switch being connected in series between the dropping resistor side of the first indicator and one source at a pole opposite the dropping resistor, a third current-conduction indicator, a current limiting resistor, said third indicator and current limiting resistor being connected in series from the center terminal of said switch across said second indicator, a test terminal connected to the center terminal of the switch, and a test terminal connected to that terminal of said second indicator not connected to said switch, such that, when the test terminals are connected across a line to be tested while said switch is open, the third indicator will indicate whether the line is conducting a current, such that, when the test terminals are connected across a line having relatively high resistance while said switch is closed, said sources oppose current flow through the first indicator and allow current to flow freely through the second indicator, and such that, when resistance in the line across said test terminals is successively lowered, reduced opposition to current flow causes the first indicator to give an increasingly dynamic indication and increased shunting of the second indicator causes the second indicator to give a decreasingly dynamic indication.

References Cited in the file of this patent

UNITED STATES PATENTS

| | | |
|---|---|---|
| 1,560,278 | Mahan | Nov. 3, 1925 |
| 2,383,557 | McClellan et al. | Aug. 28, 1945 |
| 2,469,703 | Simkins | May 10, 1949 |